Nov. 22, 1960 M. I. BURGETT, JR 2,961,576

ELECTRICAL SYSTEMS

Filed Dec. 23, 1957 2 Sheets-Sheet 1

INVENTOR.
MONTE I. BURGETT, JR.
BY
Nelson E. Kimmelman
ATTORNEY

INVENTOR.
MONTE I. BURGETT, JR
BY Nelson E. Kimmelman
ATTORNEY

United States Patent Office 2,961,576

Patented Nov. 22, 1960

2,961,576

ELECTRICAL SYSTEMS

Monte I. Burgett, Jr., 7143 Lincoln Drive, Philadelphia 19, Pa.

Filed Dec. 23, 1957, Ser. No. 704,803

13 Claims. (Cl. 315—21)

This invention relates to cathode-ray tube display systems and in particular to cathode-ray tube systems for reproducing images of scenes televised in color.

Color television display systems are known which employ a cathode-ray tube having a fluorescent screen which comprises a plurality of sets of substantially parallel phosphor strips, each set being emissive of light of a predetermined color in response to electrons impingent thereupon. Systems employing such a screen are described in U.S. Patent No. 2,773,118 issued to R. C. Moore on December 4, 1956. In such systems one or more image-forming electron beams are deflected in paths which may extend generally parallel to the phosphor strips and means are used for coordinating the modulation of the beam with the color of the light emitted by that section of the screen on which the beam contemporaneously impinges. If this coordination is lacking the reproduced images will contain serious color errors.

One possible way of preventing such color errors would be to provide an absolutely perfect vertical deflection system which would precisely position each scanning path in its proper vertical place in the raster and would not allow the beam or beams to depart from a predetermined vertical position in the course of scanning in each scanning path. Such deflection systems would be difficult, if not impossible, to design and their cost would rule them out for use in home television receivers.

It was found much more feasible to devise indexing systems which undertook to overcome the deficiencies that did exist in the vertical deflection circuit. Thus, circuits were devised, for example, for preventing irregularities in the spacing between the lines of the scanning pattern. One of the first methods used to keep the successive scanning paths of the reproduced image uniformly spaced was to employ a servo system which detected the relative vertical position of the beam (assuming a single image-forming beam was employed) at the beginning (or end) of each scanning path and produced an error signal if the beam was not in its predetermined normal position. Such a system is described in U.S. Patent No. 2,685,047 issued to D. G. Moore on July 27, 1954. Where only the latter type of servo system was used, once the beam position error had been detected at the beginning of the scanning path, the beam position was corrected only for its initial error and no further detection and correction of error was made during the course of scanning the rest of the line. Such aberrations as did subsequently occur adversely affected color fidelity because the beam modulation was not coordinated with its position on a particular phosphor strip.

Accordingly, in order to correct intra-line errors in the relative vertical position of the electron beam which occurred during the course of scanning of the balance of each scanning path, other systems were devised which additionally detected instantaneous departures, as measured in a vertical direction, of the average position of the scanning beam or beams from a predetermined axis.

Such systems are described in the aforementioned R. C. Moore Patent 2,773,118.

In these prior art systems the raster was either essentially rectangular or else, if the tube face was round and it was desired to scan out to the edge of the faceplate, the latter was so masked as to form a truncated circle, the curved portions thereof constituting the curved sides of the raster. In the case of a completely rectangular raster if it was desired simply to measure the starting positional error of the beam it was relatively easy to dispose electron-sensitive elements in a straight line along one side of the raster.

On the other hand, in the case of a raster with curved sides, elements could be disposed in a straight vertical line so that the error could be measured during intervals occurring at the same relative time after the start of each line scan. However, this would mean that up until such error is measured, a certain amount of color error might arise which would tend to produce an unpleasant, color-distorted image. If the edge portion of the curved raster were to be masked off to hide the erroneous color presentation, the useful area of the tube face would be reduced and smaller visible images would be produced. Since the size of the image produced by home-type television receivers is an important consideration to a potential set buyer, such masking increases the difficulty of selling a set to him.

Where it is desired to produce rasters having curved sides and to employ an indexing structure as shown in the last-named R. C. Moore Patent 2,773,118, it is often desired to measure both the starting positional error of the beam and the intra-line error. With such an arrangement, if it is desired to measure the starting beam position error, as well as to monitor the beam position in each line, apparatus would be required for separating indexing signals produced when the beam scanned the initial portion of each line from those produced during the scanning of the balance of each line. Accordingly an object of the present invention is to provide a system for utilization of larger areas of beam-intercepting structures of cathode ray tubes.

Another object of the invention is to provide a system for improving the color fidelity of images reproduced by display tubes of the type described.

Still another object of the invention is to provide an improved beam-indexing system for a cathode ray tube display system.

Yet another object is to provide a cathode ray tube system for producing colored images whose constituent elements are rendered with good color fidelity.

Another object of the invention is to permit the use of a simple indexing element structure with an improved beam-indexing system for an overscanned type of display tube.

Figures 1, 2, 3:
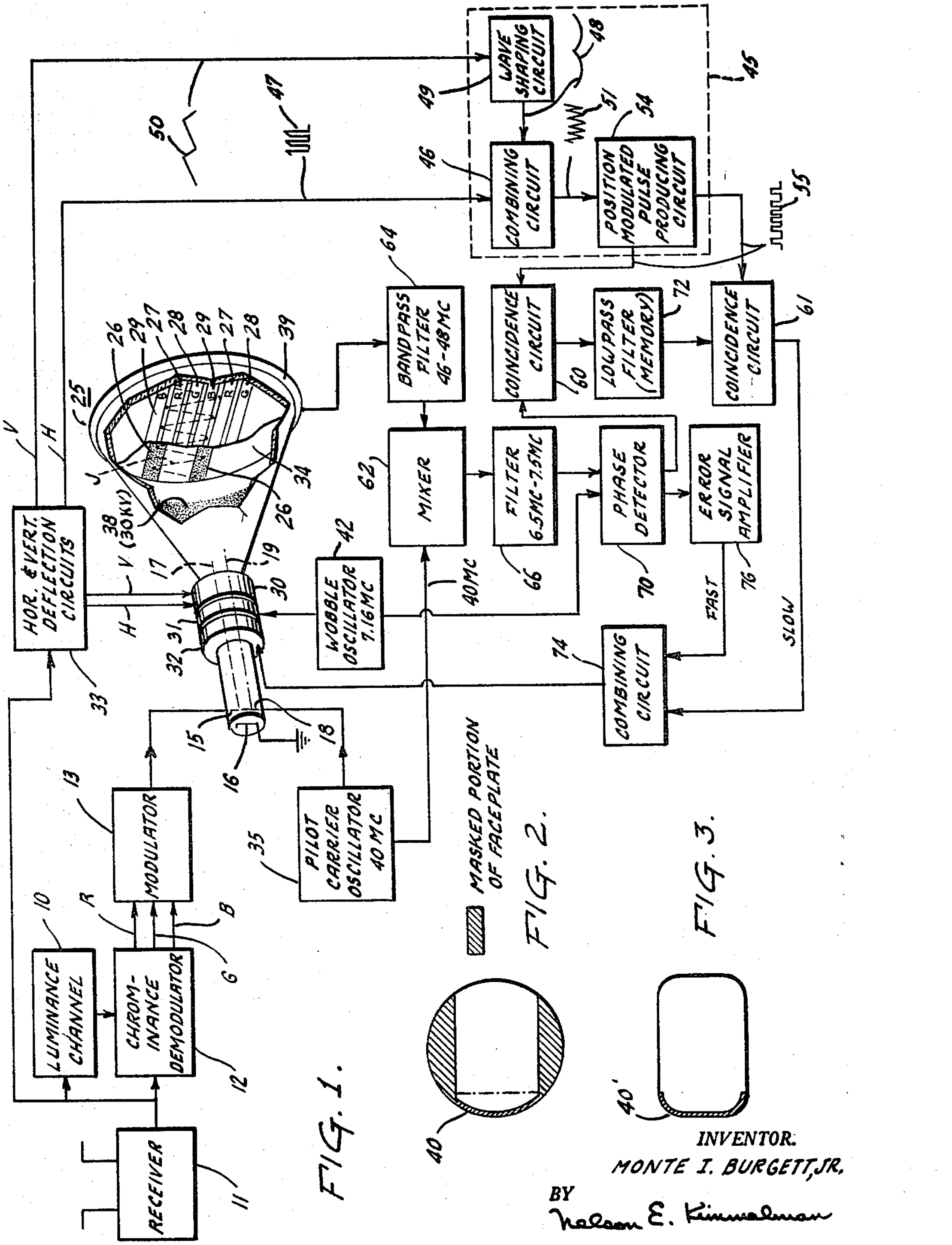
Figure 1 is a block and schematic diagram of a color television receiver which incorporates the present invention.
Figures 2 and 3 show faceplates of cathode ray tubes having characteristics which would benefit from the use of the present invention.

In accordance with my invention I provide, in a cathode ray tube system in which a raster of scanning lines is formed whose initial portions fall along a curve, means for measuring the relative position of the beam during the scanning of those initial portions. Rasters of this description are often produced in "rectangular" and in round faceplate television display tubes in which the beam is caused to "overscan" the faceplate at a number of points and in which the sides of the raster extend essentially out to the curved edge of the faceplate.

In one form the invention is employed in connection with an overscanned color television display device wherein it is desired to produce images as large as possible which manifest good color fidelity throughout. One such display device, for example, contains a fluorescent screen disposed over the entire faceplate of a round-face cathode ray tube. The sides of the raster produced thereon substantially coincide with the curved edge thereof. A set of parallel elongated indexing strips are deposited on the screen and extend over the raster area in the direction in which the beam is scanned. With this type of device I provide apparatus for segregating indexing signals resulting from scanning of the portions of the indexing strips located at the initial portions of each line from those resulting from the scanning of other portions of said strips. The segregated signals may then be used, for example, to correct the beam's position at the start of each line.

To accomplish the desired segregation I provide a system for producing gating pulses coincident with the traversal by the beam of that portion of the screen located next to one of the curved sides of the raster. Since the side of the raster is curved, the occurrence of the gating pulses is modulated to correspond thereto. To produce the requisite position-modulated pulses, I provide means for producing a waveform corresponding to the curvature of the edge of the screen. For example, if the tube is round, the edge of the screen on the left side of the raster has approximately a parabolic curve. Accordingly, in one embodiment of the invention, I provide a circuit which produces a parabolic waveform possessing substantially the same curvature characteristics as the side of the raster. This waveform is produced once during each field scanning interval, i.e., 1/60 of a second. During the same interval I also provide a circuit for superimposing a series of about 262 saw-tooth waves (derived from the horizontal deflection circuit) upon the parabolic waveform to produce a composite parabola-sawtooth wave. This composite wave is then applied to a circuit responsive thereto which produces a set of pulses whose spacing in time varies as a function of the instantaneous amplitude of the parabola. The latter circuit may comprise, in one form, a double limiting stage (i.e., a "top and bottom clipper") which produces an output wave consisting of position-modulated pulses of substantially uniform amplitude. These pulses are then applied to a coincidence circuit, to which the indexing signals are also applied, for gating out the latter signals when the beam scans the beginning of each line. The indexing signals separated thereby are then employed to correct the beam starting position so that color fidelity of the image may be maintained out to the very edge of the raster.

The invention will be described primarily in connection with a color television reproducing system of the type wherein one beam is used to form the image by being scanned in the direction in which the phosphor strips extend and wherein two circuits are used for maintaining the position of the beam in its proper vertical position, i.e., one circuit, known as the "slow" or "memory" servo, determines the relative vertical position of the beam at the beginning of each scanning path whereas the other, known as the 'fast" or "line" servo monitors the instantaneous position of the beam during the traversal of each scanning path once its initial position has been determined by the slow acting servo.

Referring to Figure 1 a block and schematic diagram of an overall receiving system of this type is shown. A receiver 11 which comprises a conventional television tuner, intermediate frequency stages, and a video detecting stage supplies a detected composite color video signal to a conventional chrominance demodulator circuit 12. The demodulator may consist of a plurality of conventional synchronous detectors, for example, together with appropriate matrix circuits which combine detected color difference signals with the luminance component from the luminance channel 10 to produce output signals corresponding to the red, green and blue components present in the elements of the scenes televised. Such demodulators are described at pages 40 and 66, 67, 68 inter alia, of "Color TV, Simplified Theory and Service Techniques," published by the Philco Corporation. These color-representative signals are then applied to a modulator 13 where they are used to produce an output wave which represents in successive predetermined intervals the intensities of different ones of said colors in said elements taken in a predetermined sequence. The modulator 13 may take the form, for example, shown in my co-pending patent application Serial No. 510,221, filed on May 23, 1955. The output signal of the modulator is applied to a control grid 15 placed in proximity to a cathode 16 for governing the intensity of an electron beam represented schematically by the broken line 17, the latter beam being termed hereinafter the "video" or "writing" beam.

The video beam 17 is deflected from right to left (over the screen 25 as viewed from inside the tube) in a series of essentially rectilinear scanning paths. The screen 25 is deposited on the internal surface of the faceplate of the cathode ray tube 20 and consists of a number of sets of phosphor strips 27, 28 and 29 extending across the face of the tube 20. The strips emit red, green and blue light respectively when struck by the electron beam 17. Behind the phosphor strips an electron-permeable and light reflective layer 34 is deposited for preventing screen deterioration due to the impact of ions thereupon and for increasing the brightness of the reproduced image. On the rear surface of the layer 34 a number of indexing strips 26 are disposed each of which overlaps onto two adjacent red and blue emissive strips 27 and 29 respectively. The strips 26 may have a secondary electron emissivity different from that of the other parts of the screen 25 so that when traversed by the beam an indexing signal will be generated in a manner to be explained. Alternatively the strips 26 may emit light of a selected wavelength to which an appropriate photosensitive device responds and generates an electrical signal therefrom.

As stated previously the video beam 17 is modulated so that at successive intervals of time its amplitude corresponds to the intensity of selected ones of the primary colors of the scene televised taken in a predetermined sequence. To correlate this modulation with the scanning of the phosphor strips the vertical position of the video beam 17 is changed cyclically during the scanning of each path to correspond to its modulation so that when it is traversing a red-emissive strip, for example, it will be modulated by a red-representative signal as explained in the cited R. C. Moore patent. To accomplish this auxiliary vertical deflection, an auxiliary "wobble" deflection yoke 31 is employed which is energized by a sinusoidal current wave from oscillator 42 at, for example, 7.16 mc., i.e., twice the frequency of the color subcarrier at 3.58 mc. The beam 17 therefore traces a sinusoidal path in each of its scanning lines as shown by the broken line J in Figure 1.

In order to make sure that the video beam 17 is modulated by a signal whose intensity corresponds to the color emitted by the phosphor strip on which it impinges at any given instant, either the video beam 17 itself as it impinges on the indexing strips 26 is used to produce indexing signals or, as in the system illustrated in Figure 1, an auxiliary low-current beam 19 is employed. The auxiliary beam 19 (hereinafter known as the "indexing" beam) is subjected to substantially the same sinusoidal deflection as the beam 17. In order to be able to separate the indexing signals due to the impingement of the indexing beam 19 on the indexing strips 26 from those produced by the inpingement of the video beam 17 thereupon, the former is modulated at a frequency well outside the range of the frequencies at which the video beam 17 is modulated. For example, the indexing beam 19 may be modulated at 40 mc. by a signal applied from the "pilot carrier" oscillator 35 to the control grid 18. The use of a separate beam for generating the indexing signals has been found desirable from the standpoint of keeping the indexing signals free from the video signal contamination and vice versa and also for other reasons which aid in the satisfactory functioning of the overall system. Reference is made to U.S. Patent No. 2,742,531 to M. E. Partin wherein the use and operation of two-beam color television receiver systems is taught.

The beams 17 and 19 are arranged substantially in vertical alignment and close to each other and are deflected in unison by substantially the same electromagnetic fields created by the conventional deflection yoke 30 when energized by appropriate horizontal and vertical deflection signals supplied from the horizontal and vertical deflection circuit 33. The circuits 33 are themselves actuated in response to corresponding synchronizing signals appearing in the composite color video signal detected in the receiver 11. The indexing beam 19 has a very low current density so as not to desaturate the image produced by the video beam 17 to any appreciable extent.

When the indexing beam is scanned cyclically over the indexing elements 26 secondary electrons are emitted which are attracted to a second anode coating 38 deposited on the inner surface of the flared portion of the tube 20 to which a relatively high positive potential such as 30 kv. is applied. The emission of the secondary electrons causes the charge on the screen 25 to vary and these variations are transmitted capacitively via the glass envelope of the tube to a conductive ring 39 which encircles the area near the rim of the faceplate. Consequently, a varying displacement current is generated which is applied to two servo systems as will be explained below.

*Operation of the "slow" servo*

The invention will now be described as it performs in conjunction with the so-called "memory" type of servo system. It has hitherto been known that the performance of cathode ray tubes such as the one described can be improved by measuring the relative vertical position of the beam at the beginning of each scanning line, deriving an error signal and using this error signal to position the beam at the desired normal starting point. It has also previously been known that the starting errors of any two or three successive lines, for example, are not appreciably different from one another so that if the error of the previous line is known (or if the errors of a number of previous lines are averaged) and the position of the beam prior to the scanning of the next line is adjusted in response thereto, there will probably be only a small amount of incremental error in the beam position to be corrected. Accordingly, servo systems have been employed in which the error signal developed by the scanning of the indexing elements at the beginning of the preceding line or lines is stored in a "memory" or long time-constant circuit and used to position the beam just prior to the beginning of the scanning of the next line so that when the beam scans the initial portions of the indexing elements associated therewith an indexing signal will be derived which is indicative merely of the increment of error. This technique helps to minimize the phenomenon known as "twinning" (i.e., the scanning by the beam of the same triplet in two successive lines) and "skipping" (i.e., the skipping by the beam of the scanning of the triplet which normally would be next in order).

In order to explain the operation of the slow servo, the general system for obtaining the desired indexing signal will first be described. Since both beams 17 and 19 are "wobbled" at 7.16 mc. the signals resulting from their impingement on the indexing strips 26 will also have components related thereto. If the beams are in their correct vertical position so that their sinusoidal excursions are centered about a line midway between two adjacent indexing strips 26 (see J, Figure 1) a signal will be generated at double the wobble frequency (14.32 mc.) since two indexing pulses per cycle will be produced corresponding to the impingement of the beam 19 on the strips 26 during the positive and negative half cycles. This signal, when combined with the pilot carrier frequency (40 mc.) will produce a signal that will not be passed by the filter 64 so that no corrective signal will be applied to the auxiliary yoke 32.

However, if the indexing beam 19 is scanning off-center, the impingement thereof on the strips 26 will produce indexing signals having a frequency of 7.16 mc. plus 40 mc. (i.e., the pilot carrier frequency) or 47.16 mc., which will be passed by filter 64. The 47.16 mc. signal is then applied to one input of a conventional mixer 62. To the other input the signal frequency signal (40 mc.) from the pilot carrier oscillator 35 is applied. It should be noted that any signals due to the impingement of the video beam 17 on the strips will not be passed by the filter 64 because of the latter's pass band.

Figures 4, 5:
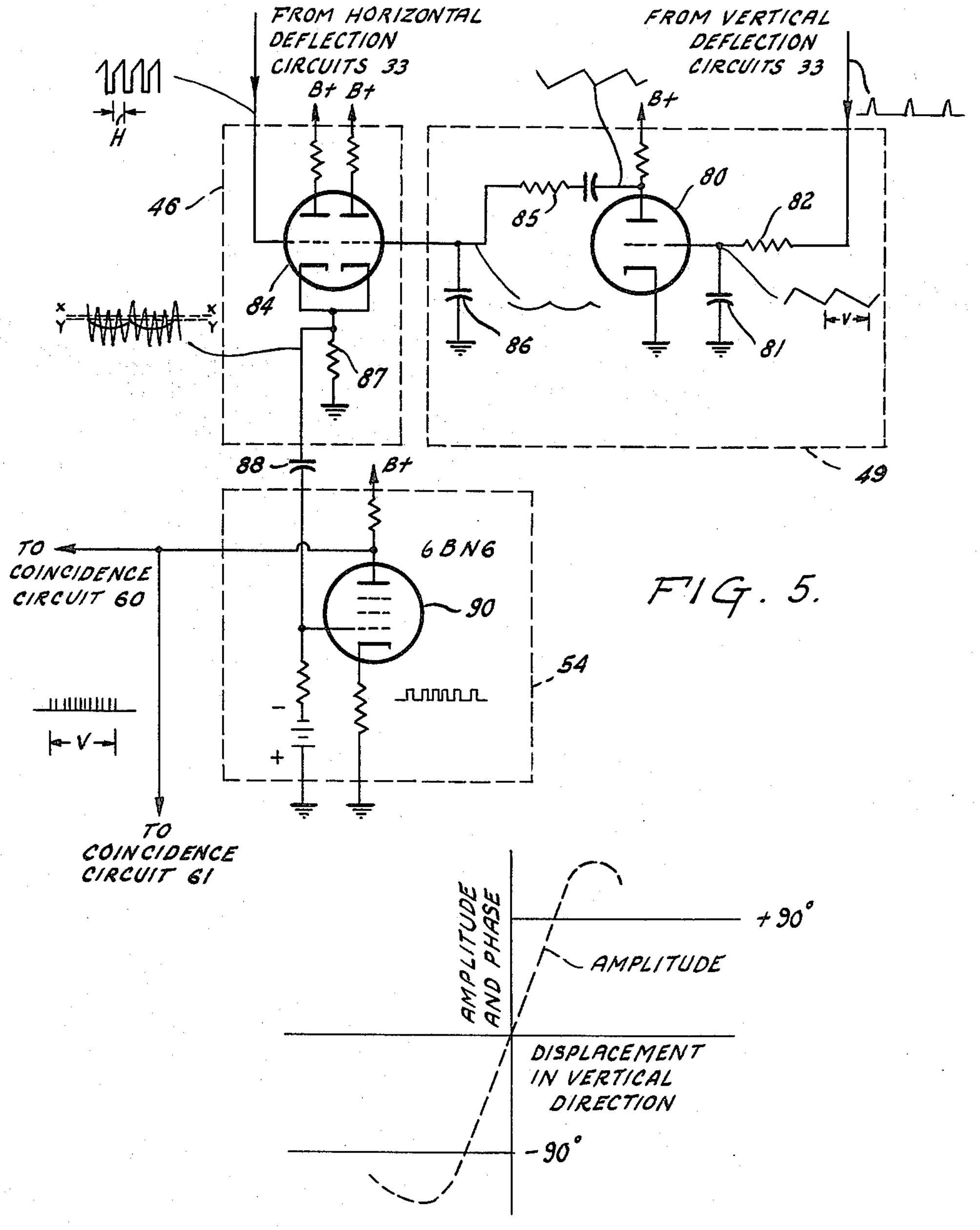
Figure 4 is a graphical presentation of the characteristics of one element in the overall system depicted in Figure 1.
Figure 5 is a circuit diagram corresponding to the blocks enclosed in dashed lines in Figure 1.

In order to eliminate the component of the indexing signals which corresponds to the pilot carrier frequency the output of the filter 64 and of the pilot carrier oscillator 35 are applied to mixer 62 which produces as one of its output signals indexing signals in the 6.5 mc.–7.5 mc. range. These are then filtered by the filter 66 and applied to a phase detector 70 which may be of conventional construction. To another input of the phase detector 70 an oscillatory wave at the "wobble" frequency (7.16 mc.) is applied from the wobble oscillator 42. The detector 70 thereupon measures the phase difference between the signals from the filter 66 and the oscillatory wave and produces an output error signal which is applied to a coincidence circuit 60 which may be of conventional design. Figure 4 is a graph showing the relation of beam displacement to the amplitude and phase of the error signal produced by detector 70.

In order to measure the vertical positional error of the scanning beam so as to correct the beam position at the very beginning of the scanning of each visible line of the curved raster it is necessary to sample the positional error of the beam as it traverses the cross-hatched area 40 of the raster as shown in Figure 2. This area includes the initial portions of the scanning paths on the left side of te screen 25. Since the beam 17 will scan this area at different times relative to the beginning of each line interval in the signal, I provide apparatus for generating time-modulated pulses which occur coincident with the scanning of the area 40 and which are used to gate out indexing signals resulting from the scanning by the beam 19 of the portions of the indexing strips 26 located within the area 40.

According to one form of my invention I have therefore provided, as shown within the dashed-line rectangle 45 of Figure 1, apparatus which will produce time-modulated pulses occurring during the scanning of the portion 40 by the beam 17. The apparatus shown therein includes a combining circuit 46 to which a horizontal trapezoidal wave 47 is applied from the deflection circuits 33. In addition a parabolic wave 48 is supplied to circuit 46 from the wave-shaping circuit 49 in response to the application to the latter of a saw-tooth wave 50 from the vertical deflection section of the deflection circuits 33. The combining circuit 46 thereupon produces a composite output wave 51 comprising a parabolic waveform on which the trapezoidal wave 47 has been superimposed. The composite wave 51 is then applied to a time-modulated pulse-producing circuit 54 which produces a second composite output wave 55 in which the pulses occur at unequal intervals of time corresponding to the time intervals during which the beam 17 scans the portion 40. The composite wave 55 is then applied to another input of the coincidence circuit 60 to which indexing signals are continuously applied.

The coincidence circuit 60 is so constructed that only when the time-modulated gate pulses from the circuit 54 are applied thereto will the error signal be permitted to appear in its output. At these times the error signal is applied to a low-pass filter circuit 72 which, in effect, stores or "memorizes" the error and retains it until at least the beginning of the scanning of the next line. Actually the filter 72 may have a time constant which integrates the error over a period of 10–20 lines, for example. The output of the filter 72 is coupled to the input of the combining circuit 74 via another coincidence circuit 61 which passes the signal stored in the filter 72 thereto only when the pulse producing circuit 54 supplies a pulse to the circuit 60. By so doing the slow servo signal is, in effect, so gated as to control the beam only during the time that the latter scans the portion 40.

The output signal of circuit 74 is then applied to still another auxiliary vertical deflection coil 32, for example, which is positioned behind the wobble coil 31 and which moves the beams up or down as the case may require to adjust the starting position thereof. As explained above, once the starting position of the beam has been adjusted at the beginning of each line in response to the action of the slow servo, the operation of the latter servo ceases because of the manner in which it is gated or controlled by gating wave 55 and coincidence circuits 60 and 61.

*Operation of the line servo*

In the system shown, the beam, during its traversal of the remainder of the line, is additionally maintained in the correct vertical position by the operation of the "fast" or "line" servo. This servo employs some of the same components as were used by the slow servo. Actually, the chief difference between the two servos is the fact that in the fast servo there is no storage of the error signal produced in the output of the phase detector 70 during the scanning of the remainder of the line but instead the error signal is used immediately to correct the position of the beam.

As in the operation of the slow servo a wave at the pilot carrier frequency of 40 mc. is supplied from oscillator 35 to the mixer 62 which mixes it with the indexing signals appearing in the output of bandpass filter 64 to produce indexing signals around 7.16 mc. The latter signals are applied via filter 66 to the phase detector 70 where they are compared in phase with a reference wave at 7.16 supplied by the wobble oscillator 42. The error signal produced by the phase detector 70 is continuously applied to error signal amplifier 76, and thence, via combining circuit 74, to the auxiliary coil 32. In this way the position of the video beam is constantly monitored during the scanning of the remainder of each scanning path after its starting position has ben adjusted by the operation of the slow acting servo as explained previously.

*Detailed operation of gating pulse circuit*

In order to understood more clearly the operation of the apparatus contained within the rectangle 45 there is shown in Figure 5 one form of a circuit that may be used therein. Vertical synchronizing pulses from the deflection circuits 33 are applied to the control grid of a tube 80 by way of an integrating circuit comprising the condenser 81 and the resistor 82. At the junction of the latter two elements a saw-tooth wave is produced as shown. On the plate of the tube 80 the same saw-tooth wave will appear with inverted polarity. The inverted wave is then applied to one half of the double triode 84 via another integrating circuit comprising resistor 85 and condenser 86. At the junction of the latter two elements a parabolic waveform is produced as shown.

To the control grid of the other half of the double triode 84 a trapezoidal wave from the horizontal section of the deflection circuit 33 is applied. Since the plate current of both halves of the double triode 84 flows through the same cathode load resistor 87 there will appear across the latter a composite wave, as shown, which consists of the horizontal wave superimposed upon the vertical parabola. This cathode output wave is applied via the coupling condenser 88 to the control grid of a tube 90 which may be of the 6BN6 type, for example. The parameters of the tube are so chosen that both grid and plate limiting of the input wave in the amplitude region between the two lines X—X and Y—Y is performed. Double limiting within this amplitude range results in the production of an output wave at the plate of the tube 90, as shown, which comprises a series of pulses whose position is modulated to correspond to the times during which the beam 17 scans the initial portions in the area 40. It should be noted that the pulses produced are more uniformly spaced in the middle of the field interval than toward the ends thereof. This spacing corresponds to the variation in the rate at which the slope of the curved edge of the raster changes.

Variations of this circuit for producing the time-modulated pulses are, of course, possible. For example, instead of doubly limiting the composite parabola-saw-tooth wave, the latter could be applied to a single-shot multivibrator which would produce one pulse each time that the amplitude of the positive-going composite signal attained the value represented by the line Y—Y. Since this value would also vary as a parabolic function of time, gating pulses would be produced accordingly which occur more closely spaced in time toward the center of the parabola than near the ends thereof to correspond to the displacement in the relative time during each scanning interval in which the beam scans area 40. These pulses would then be applied to the coincidence circuits 60 and 61.

The invention has been demonstrated up to this point with particular reference to a raster produced on an over-scanned round face tube. Figure 3 shows the faceplate of a cathode ray tube of the so-called "rectangular type" in which, if a raster is produced over the full area thereof, it will have somewhat curved sides. In order to ascertain and correct for the positional error of the beam at the beginning of each visible line of the raster it becomes necessary to sample the vertical positional error of the video beam whenever it scans the shaded area 40'. It will be seen that, with respect to the beginning of each scanning interval, the time during which the beam scans the area 40' varies according to a clipped parabolic function of time. It is therefore necessary to employ within the rectangle 45 apparatus which effectively supplies to the combining tube 84 (Figure 5), for example, not a regular parabola but rather a clipped parabola. Since clipping circuits are widely known, all that is necessary is to insert a clipping stage intermediate the tube 80 and one half of the combining tube 84. In other respects the apparatus shown in rectangle 45 operates substantially the same as it did in the embodiment of the invention which employed a round face tube.

While the invention has been described in terms of a parallel-scan color television reproducing system which employs a single video beam and contains both a fast and a slow (or line start) servo, it should be understood that the invention is applicable to systems in which a slow servo only is used. Also, the invention may be used in a cathode ray tube in which the beam-intercepting structure is not fluorescent at all, but in which it nevertheless is desired that the beam, in successive scans over the structure, is in its correct predetermined position at the beginning of each scanning line, the terminal portions of the lines not falling on points on a straight line drawn perpendicular to the general direction in which the scanning paths extend.

The invention can also be used in so-called "transverse scanning" systems, i.e., those in which the phosphor strips extend in a direction essentially perpendicular to that in which the beam is scanned, but in which indexing elements extend horizontally in the region of one side of the raster. Many other applications of the invention are also possible such as in color television reproducing systems of the parallel scan type in which three video beams are deflected in unison, each of the beams being modulated by signals corresponding to the intensities of the color of the element then being scanned at the transmitter. With such systems the invention could be used to insure that, at the beginning of each line, the beams impinge respectively on strips emissive of the proper colors. Thereafter, by using a set of elongated indexing strips similar to the one shown in Figure 1, the positions of the three beams may additionally be monitored during the course of scanning each scanning path, if desired.

It will be understood that still other applications of the invention described herein will occur to those skilled in the art. Consequently, I desire the scope of this invention to be limited only by the following claims.

I claim:

1. A cathode ray tube system comprising a cathode ray tube in which an electron beam is produced, said tube having a beam-intercepting structure located at one end thereof, means responsive to periodic signals for deflecting said beam over said structure in a plurality of scanning paths which form a raster, the terminal portions of said scanning paths on one side of said raster being scanned at predetermined varying intervals after corresponding ones of said periodic signals, electron-permeable indexing elements disposed behind said terminal portions, and beam-adjusting means responsive only to the signals produced by the scanning of said beam over said indexing elements.

2. A cathode ray tube system comprising a cathode ray tube in which an electron beam is produced, said tube having a beam-intercepting structure near one end thereof, means responsive to periodic signals for deflecting said beam over said structure in a plurality of scanning paths, the terminal portions of said paths falling at points along a curve and being arranged to be scanned by said beam at predetermined varying intervals, electron-permeable indexing elements disposed along a corresponding curve behind said terminal portions, and means responsive only to the signals produced by the scanning of said beam over said elements for adjusting the position of said beam.

3. A cathode ray tube system comprising a cathode ray tube in which an electron beam is produced, said tube having an electron-sensitive screen at one end thereof, means for deflecting said beam over said screen in a plurality of scanning paths, the initial portions of the scanning paths falling at points along a curve, electron-permeable indexing elements disposed along a corresponding curve behind said initial portions, said indexing elements being scanned at varying intervals by said beam whereby corresponding time-varying indexing signals are produced, and means responsive only to the indexing signals produced by the scanning of said beam over said elements for adjusting the position of said beam as measured in a direction substantially transverse to the direction in which said paths extend.

4. A cathode ray tube system comprising a cathode ray tube in which an electron beam is produced, said tube having an essentially planar fluorescent screen disposed in proximty to the inside surface of the faceplate thereof, means for deflecting said beam over said screen in a plurality of substantially parallel scanning paths which form a raster, the initial portions of the scanning paths on one side of said raster falling at points along a curve, electron-permeable indexing elements disposed along a corresponding curve behind said initial portions, said indexing elements being arranged to be scanned by said beam at varying intervals, and means responsive only to the indexing signals produced by the scanning of said beam over said elements for adjusting the position of said beam as measured in a direction transverse to the direction in which said paths extend.

5. A cathode ray tube system comprising a cathode ray tube in which an electron beam is produced, said tube having a substantially flat fluorescent screen disposed near the inside surface of the faceplate thereof, means for deflecting said beam over said screen in a plurality of substantially parallel scanning paths which form a raster, the initial portions of the scanning paths on one side of said raster falling at points along a curve which substantially coincides with the curve of the edge of said faceplate in proximity thereto, electron-permeable indexing elements disposed along said edge behind said initial portions, said indexing elements being arranged to be scanned by said beam at varying intervals, and means responsive only to the indexing signals produced by the scanning of said elements by said beam for adjusting the position of the beam as measured in a direction transverse to the direction in which said paths extend.

6. A cathode ray tube system comprising a cathode ray tube in which an electron beam is produced, said tube having a beam-intercepting structure including a fluorescent screen disposed on a substantially flat surface therein, means for deflecting said beam over said screen in a plurality of substantially parallel scanning paths, to form a raster on said screen, the initial portions of said scanning paths on one side of said raster falling at points in a region along a curve, said structure also including a plurality of elongated electron-permeable indexing elements disposed substantially parallel to and substantially coextensive with said scanning paths on said screen and having portions situated behind said region, means coupled to said structure for adjusting the position of said beam as measured in a direction transverse to the direction in which said paths extend, and means for actuating said adjusting means which is responsive at varying intervals only to the scanning by said beam of those portions of said indexing elements situated behind said region.

7. A cathode ray tube system comprising a cathode ray tube in which an electron beam is produced, said tube having a beam-intercepting structure including a fluorescent screen disposed on the inner surface of the faceplate thereof, said screen comprising a plurality of sets of fluorescent strips emissive of selected colors which extend in a first direction, said structure also including a plurality of electron-permeable indexing elements disposed substantially parallel to and coextensive with said fluorescent strips, means for deflecting said beam over said screen in a plurality of substantially parallel scanning paths extending in said first direction, the initial portions of said scanning paths on one side of said screen falling at points in a region along a curve which substantially coincides with the edge of the faceplate located in proximity thereto, means for imparting to said beam, during the course of the scanning of each path, a cyclical auxiliary deflection in a second direction which is transverse to said first direction, thereby causing said beam to impinge periodically on said indexing strips and to produce indexing signals, means for adjusting the position of said beam in said second direction in response to said indexing signals, and means for actuating said adjusting means substantially only when said beam impinges on said indexing elements in said region.

8. A cathode ray tube system comprising a cathode ray tube in which an electron beam is produced, said tube having a beam-intercepting structure including a fluorescent screen disposed on a substantially flat surface therein, said structure also including a plurality of elongated electron-permeable indexing elements behind said screen which extend across said screen in a first direction, means for deflecting said beam over said screen in a plurality of substantially parallel scanning paths which extend in said first direction, said deflecting means also causing said beam to be deflected periodically in a second direction substantially transverse to said first direction during the course of each scanning path, said deflection causing said beam to form a raster on said screen, the initial portions of said scanning paths on one side of said raster falling at points in a region along a curve, electronic servo control means coupled to said structure for adjusting the position of said beam as measured in said second direction in response to the impingement of said beam on said indexing elements located substantially behind said region, and means for actuating said beam adjusting means substantially only when said beam scans those portions of said indexing elements situated behind said region, said actuating means including means for generating pulses which are modulated in time separation according to a function which corresponds to the curvature of said curve.

9. The invention according to claim 8 wherein said curve is essentially parabolic and wherein said pulse producing means produces pulses which are time-modulated according to an essentially parabolic function.

10. A cathode-ray tube system for the reproduction of televised images, said system including a cathode-ray tube having a fluorescent screen which has an arcuate boundary on at least one side thereof, means for deflecting the beam of said cathode-ray tube in a plurality of substantially parallel scanning paths selected ones of which traverse said boundary to form a scanning pattern which is oversize with respect to said screen, whereby the visible raster has an arcuate boundary conforming to the arcuate boundary of said screen, a relatively fast-acting servo for controlling the position of said beam during selected ones of said scanning paths, a relatively slow-acting servo for controlling the position of said beam, and means for limiting the control effect of said slow-acting control means substantially only to the interval during which said beam traverses a predetermined arcuate region adjacent said arcuate boundary.

11. A cathode ray tube system comprising a cathode ray tube in which an electron beam is produced, said tube having a beam-intercepting structure located at one end thereof, means responsive to periodic signals for deflecting said beam over said structure in a plurality of scanning paths which form a raster, the terminal portions of said scanning paths on one side of said raster being scanned at predetermined varying intervals after corresponding ones of said periodic signals, electron-permeable indexing elements disposed behind said terminal portions, and means responsive substantially only to the signals produced by the scanning of said beam over said terminal indexing elements for modifying said beam.

12. A system comprising a cathode ray tube in which an electron beam is produced, said tube having a beam-intercepting structure which comprises a plurality of elongated indexing elements disposed substantially across said structure, means for deflecting said beam over said structure in a plurality of scanning paths generally parallel to and coextensive with said indexing elements thereby to produce indexing signals by the impingement of said beam on said elements, said deflected beam and said structure also cooperating to form a visible raster, means for segregating the indexing signals produced by the scanning of said beam over selected portions of said indexing elements within a predetermined region, a first control system responsive substantially only to said segregated signals, and a second control system responsive substantially only to the indexing signals produced by the scanning of said beam on portions of said elements other than said selected portions.

13. A system comprising a cathode ray tube in which an electron beam is produced, said tube having a beam-intercepting structure near one end thereof, a plurality of elongated indexing elements disposed substantially across said structure, means for deflecting said beam over said structure in a plurality of scanning paths whose axes are generally parallel to and coextensive with said indexing elements thereby to produce indexing signals by the impingement of said beam on said elements, said deflected beam and said structure also cooperating to form a visible raster having on at least one side an arcuate boundary, selected portions of said indexing elements on one side of said raster being constructed and arranged to fall in an arcuate region near said arcuate boundary, means for segregating the indexing signals produced by the scanning of said selected portions of said elements, a first control system responsive substantially only to said segregated signals, and a second control system responsive substantially only to the scanning of said beam on portions of said elements other than said selected portions.

References Cited in the file of this patent

UNITED STATES PATENTS

| | | |
|---|---|---|
| 2,523,162 | Sunstein | Sept. 19, 1950 |
| 2,728,026 | Van Overbeek | Dec. 20, 1955 |
| 2,742,531 | Partin | Apr. 17, 1956 |
| 2,759,996 | Bryan | Aug. 21, 1956 |
| 2,866,128 | Burn | Dec. 23, 1958 |